(12) United States Patent
Kumar et al.

(10) Patent No.: US 10,097,499 B1
(45) Date of Patent: Oct. 9, 2018

(54) PRIVATE MESSAGE NOTIFICATIONS

(71) Applicant: QUALCOMM Incorporated, San Diego, CA (US)

(72) Inventors: Akash Kumar, Hyderabad (IN); Ankita, Hyderabad (IN); Ashutosh Giri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/646,030

(22) Filed: Jul. 10, 2017

(51) Int. Cl.
*H04W 4/02* (2018.01)
*H04L 12/58* (2006.01)
*H04W 4/12* (2009.01)

(52) U.S. Cl.
CPC ......... *H04L 51/24* (2013.01); *H04M 2250/12* (2013.01); *H04W 4/02* (2013.01); *H04W 4/12* (2013.01)

(58) Field of Classification Search
CPC ....... H04W 4/008; H04W 12/02; H04W 4/08; H04W 4/005; H04L 51/20; H04L 51/24
See application file for complete search history.

(56) References Cited

U.S. PATENT DOCUMENTS

| | | | |
|---|---|---|---|
| 9,277,043 B1 | 3/2016 | Bladon et al. | |
| 2009/0003545 A1 | 1/2009 | Katis et al. | |
| 2010/0166159 A1 | 7/2010 | Katis et al. | |
| 2011/0021178 A1 | 1/2011 | Balasaygun et al. | |
| 2014/0133644 A1 | 5/2014 | Vendrow | |
| 2017/0257757 A1* | 9/2017 | Huang | H04W 12/02 |

* cited by examiner

*Primary Examiner* — Diane Mizrahi
(74) *Attorney, Agent, or Firm* — Arent Fox, LLP

(57) ABSTRACT

The security and privacy are very important aspects of communication. Many technologies have been developed to keeping private messages secure while being transmitted from the sender to the receiver. However, the privacy of the messages can be compromised by notifications of the messages at the receiver. For example, a third party may see a visual notification of private text message displayed on a receiving device, such as a smart phone. Provided herein is an apparatus that receives a message, determines a privacy level of the message, selects a mode of notification of the message based on the determined privacy level of the message, and performs a notification action based on the selected mode of notification.

27 Claims, 12 Drawing Sheets

PRIVATE MESSAGE NOTIFICATIONS

BACKGROUND

Field

The present disclosure relates generally to communication systems, and more particularly, to systems and methods for private message notifications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. The 5G NR improvements may also be applicable to other multi-access technologies and the telecommunication standards that employ such technologies.

As communications technologies have become more advanced, consumers have become increasingly concerned about privacy. While many solutions have been directed to keeping private messages secure while being transmitted from the sender to the receiver, the privacy of the notifications of the messages once the messages are received at the receiver has not been addressed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The security and privacy of messages are very important aspects of communication. Many technologies have been developed to keep private messages secure while being transmitted from the sender to the receiver. However, the privacy of the messages can be compromised by notifications of the messages at the receiver. For example, a third party may see a visual notification of a private text message displayed on a receiving device, such as a smart phone.

In an aspect of the disclosure, a method, a computer-readable medium, and an apparatus are provided. The apparatus receives a message, determines a privacy level of the message, selects a mode of notification of the message based on the determined privacy level of the message, and performs a notification action based on the selected mode of notification.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
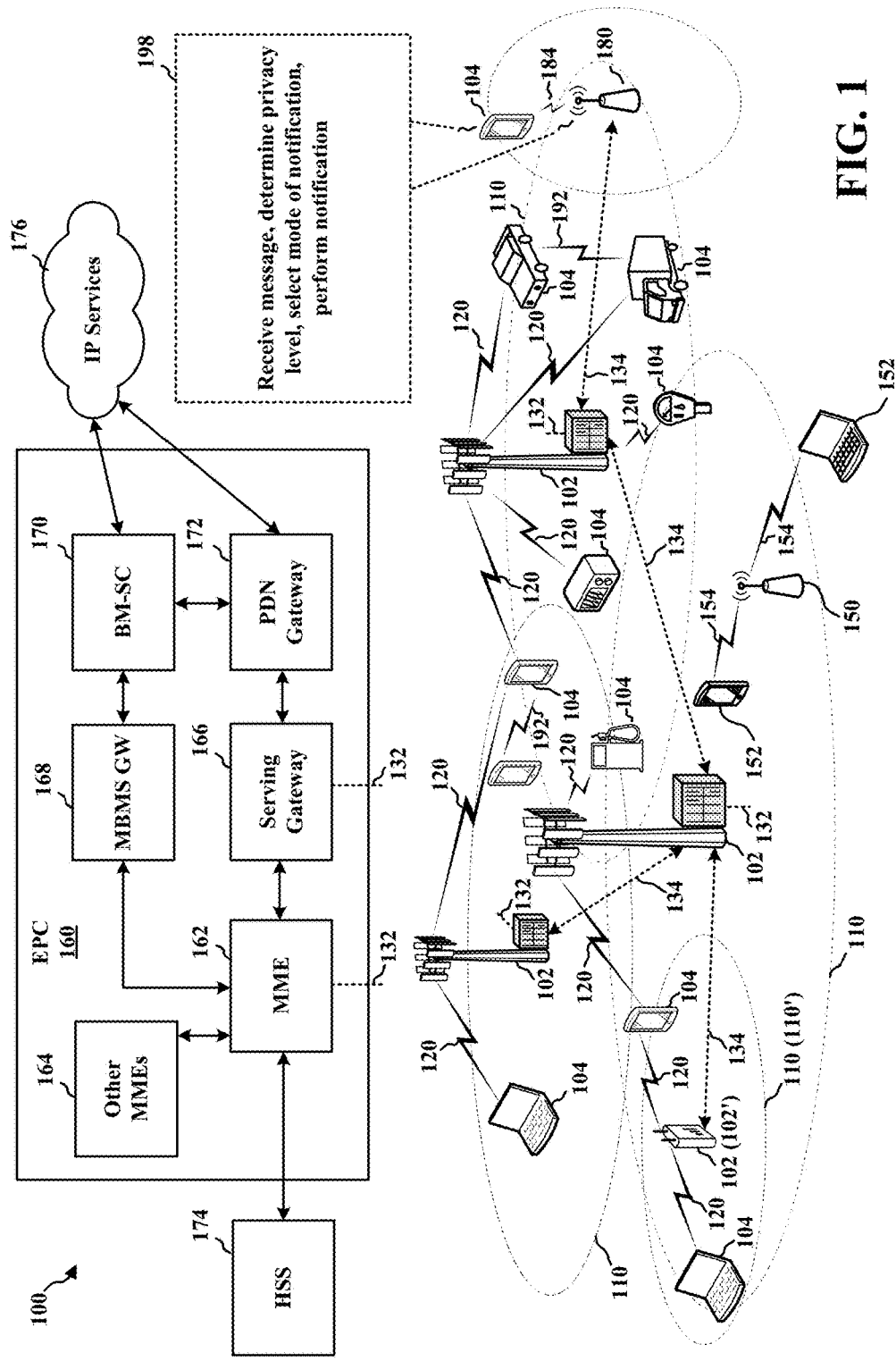
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). The elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 180 may be configured to receive a message, determine a privacy level of the message, select a mode of notification of the message based on the determined privacy level of the message, and perform a notification action based on the selected mode of notification (198).

Figure 2:
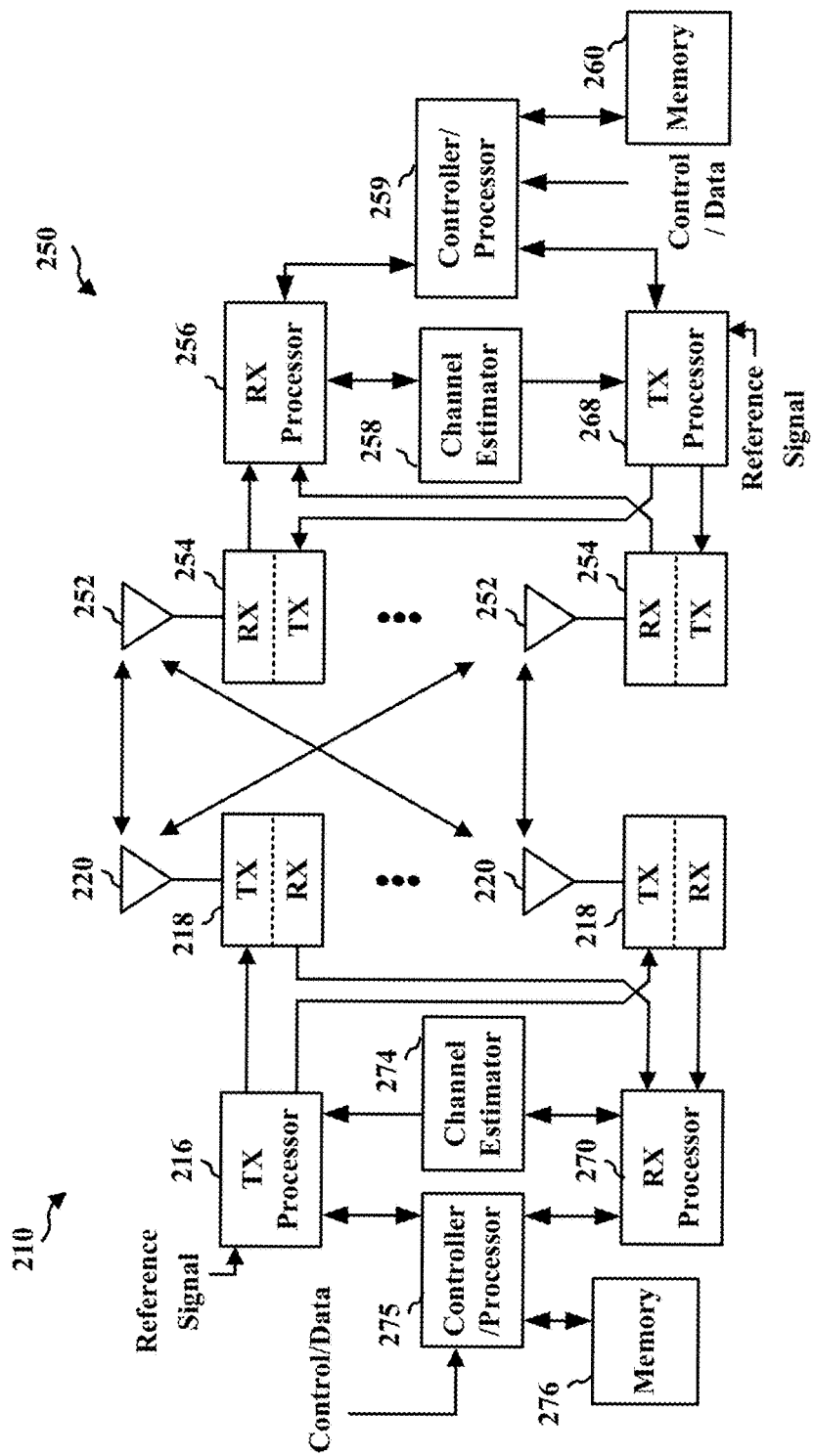
FIG. 2 is a diagram illustrating an example of a base station and user equipment (UE) in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission.

The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

In various embodiments, the privacy of a message can be maintained when a notification of the message is performed. For example, the message can be a voicemail message, a text message, etc.

Figure 3:
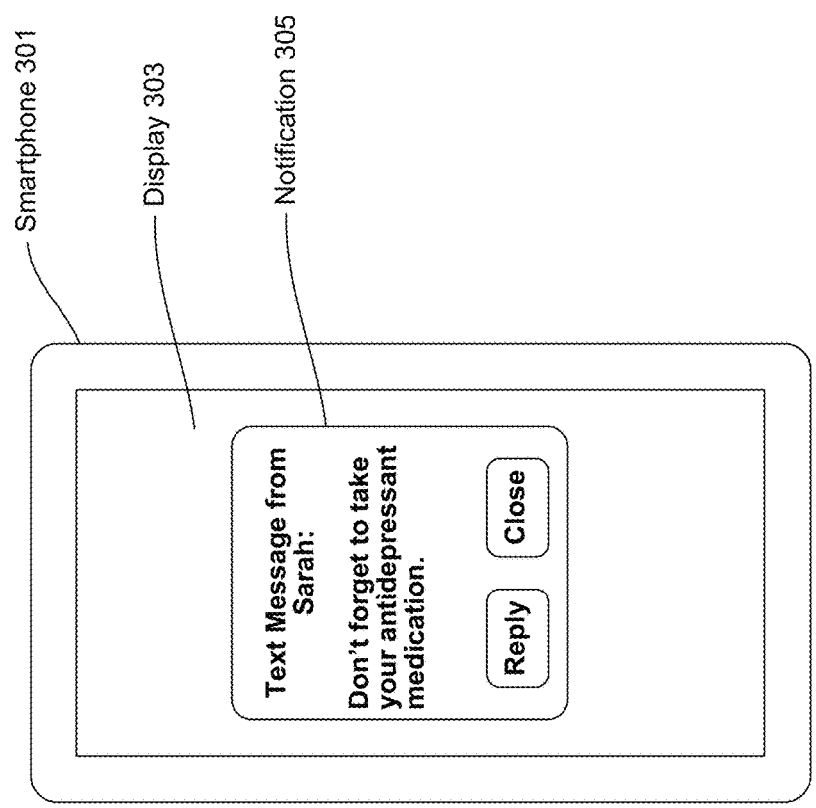
FIG. 3 illustrates an example notification of a text message in which the privacy of the message is not maintained.

FIG. 3 illustrates an example notification of a text message in which the privacy of the message is not maintained. In particular, FIG. 3 illustrates a smartphone 301 that includes a display 303. Smartphone 301 receives a text message from Sarah. A notification 305 of the text message is displayed on display 303. Notification 305 includes the text of the text message: "Don't forget to take your antidepressant medication."

If a person other than the user of smartphone 301 is looking at display 303 of the smartphone when notification 305 is displayed, the person may be able to read the text of the text message, which might embarrass the user of the smartphone because the user might not want others to know that the user takes an antidepressant medication. Thus, conventional notifications of messages, such as text messages and voicemail messages, might not provide adequate privacy protection of messages with private contents.

Figure 4:
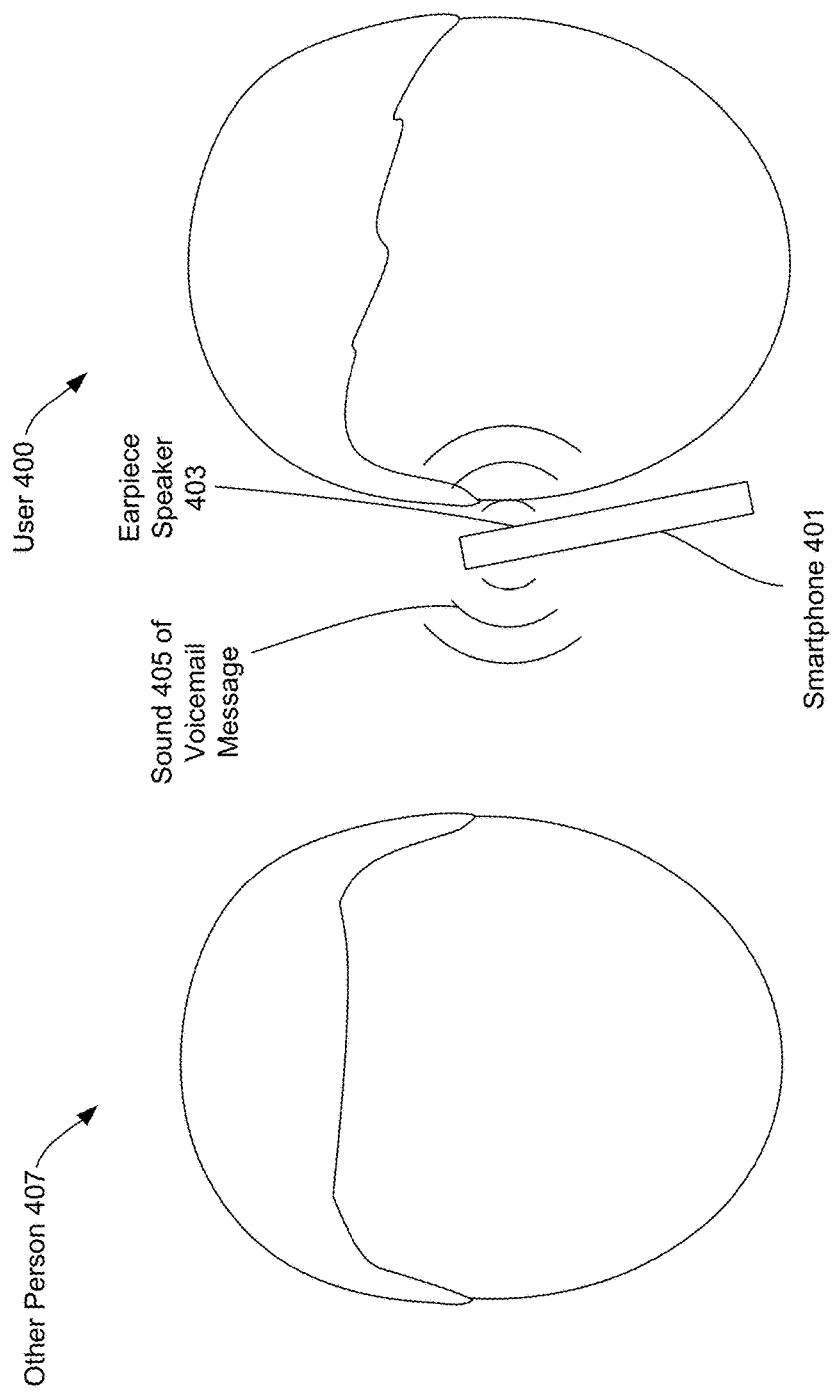
FIG. 4 illustrates an example notification of a voicemail message in which the privacy of the message is not maintained.

FIG. 4 illustrates an example notification of a voicemail message in which the privacy of the message is not maintained. In the example of FIG. 4, a user 400 receives a voicemail message on a smartphone 401. A notification of the voicemail message includes playing audio of the voicemail message on an earpiece speaker 403 of smartphone 401 (as opposed to a loudspeaker, for example). Although earpiece speakers are designed to be heard by the user only, many earpiece speakers reproduce sound at a volume that is loud enough to be heard by other people, particularly when the phone is in a quiet environment.

In this example, sound 405 of the voicemail message is reproduced loudly enough to be heard by another person 407. Thus, the privacy of the received message is not maintained during the notification of receipt of the message.

Figure 5:
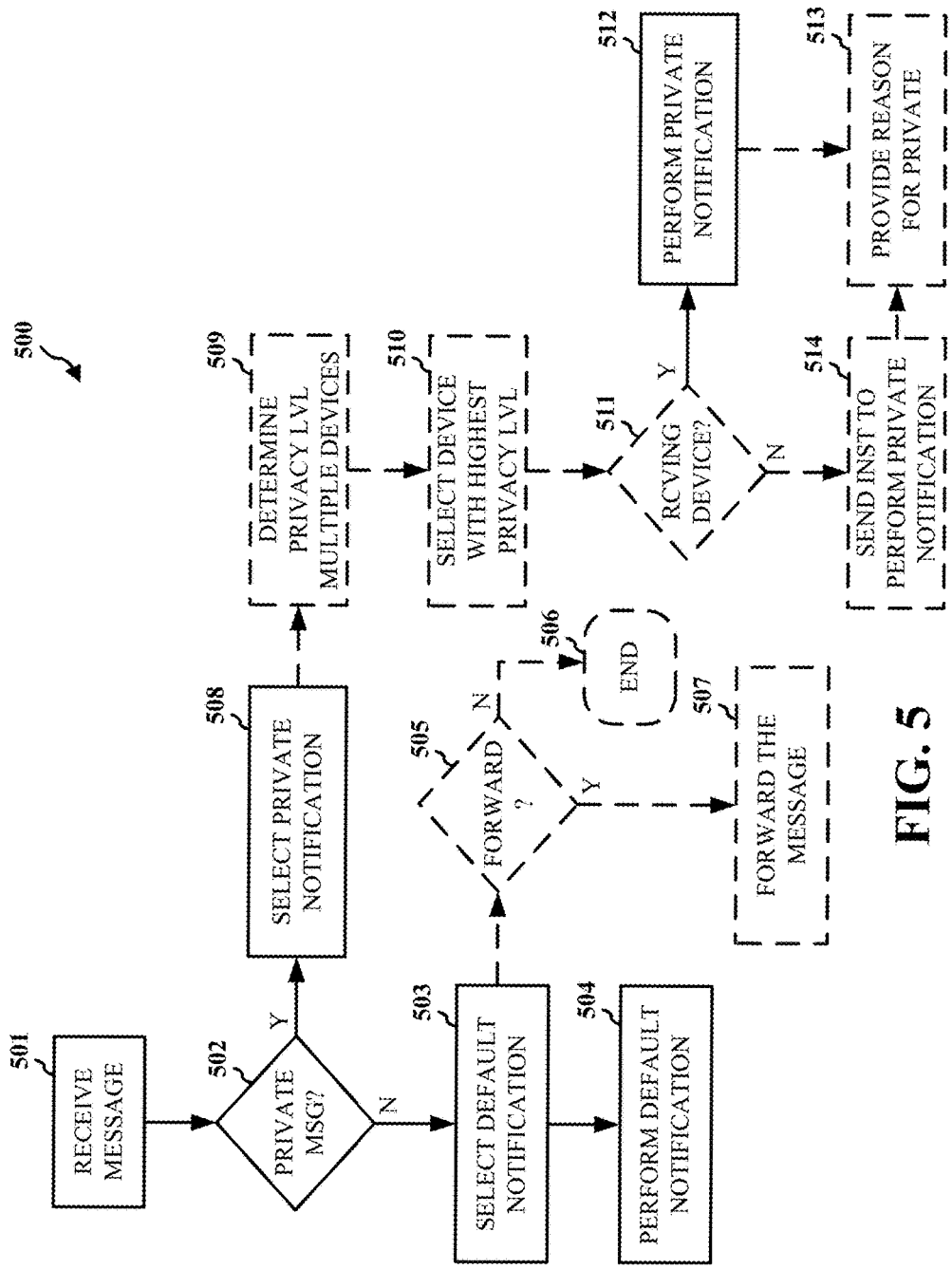
FIG. 5 is flowchart of an exemplary method of notification of a message received by an electronic device in which privacy of the message is maintained.

FIG. 5 is flowchart of an exemplary method 500 of notification of a message received by an electronic device, such as a smartphones 301 or 401, in which privacy of the message is maintained. At 501 the device may receive the message. The message may be received, for example, via a cellular service, such as a voicemail message, a text message, a short message service (SMS) message, a multimedia messaging service (MMS) message, etc. The message ma be received, for example, via a network service, such an internet chat message, a voice-over-internet-protocol (VoIP) message, etc. The message may be, for example, a text message, a voicemail message, etc. At 502 the device may determine whether the message is a private message. For example, the device can analyze the words of a text message to determine whether the text message includes private words, such as "medication," "test results," "sex," etc. In various embodiments, the device can determine information about the sender of the message, and the privacy level of the message can be based on the sender information. For example, the device may determine an identity of the sender, e.g., from a caller identification service, and may determine the sender is, for example, a doctor, a financial advisor, etc.

In this case, the device may determine the privacy level of the message is higher than a message sent by a friend, for example. In various embodiments, a list of private words may be stored in a memory on the device, for example. In another example, the privacy of a message may be determined based on whether the sender of the message has been flagged by the user as a private sender. In the case of a voicemail message, the device may perform a speech-to-text conversion of the message and analyze the text for private words, for example.

If the message is determined not to be private, at 503 the device may select a default notification of receipt of the message and may at 504 perform the default notification. For example, a default notification for a text message may include displaying the text message as a pop-up notification on the display of the device, such as shown in FIG. 3.

In some embodiments, if the message is determined not to be private, at 505 the device may also determine whether to forward the message. For example, the device may determine to forward the message if the device does not receive an indication that the user acknowledged the notification on the device. For example, referring to FIG. 3, if one of the "Reply" or "Close" buttons is pressed, the device may determine not to forward the message. In this case, the process may end at 506. However, if a button is not pressed to acknowledge the message, the device may determine that the user did not acknowledge the notification. In this case, the device may determine first identification information of the sender of the message (for example, using caller ID for a voicemail message), and may determine whether the first identification information matches second identification information in a contact list associated with a second device, for example, a device associated with a family member or friend of the user. At 507, if the sender of the message is a contact of one of the user's friends or family, the device may determine to forward the message to the second device.

At 508, if the message is determined to be private, the device may select a private notification for the message. In some embodiments, at 509 the device may determine the privacy level of multiple devices, including the device. For example, message recipient may own multiple devices capable of performing a notification of receipt of the message. For example, the device may be a smartphone, and in addition to the smartphone, the message recipient may own a smart watch and a tablet computer. In order to perform notification of receipt of the message while maintaining the privacy of the message, at 510 the device may select one of the recipient's devices with the highest privacy level.

In various embodiments, determining the privacy level of a device may include determining an orientation of the device. For example, the device may include accelerometers that can detect acceleration/gravity in three axes. If the orientation of the device is determined to be face-down, for example, then the device may be lying on a horizontal surface, such as a table. Thus, the display screen of the device is likely to be unable to be seen. The face-down orientation may have a higher level of privacy than, for example, a device with a face-up orientation. Similarly, certain orientations of a device may be associated with being carried in a pocket, for example. Orientation information may also be used to determine whether the device is being used, for example. Other sensor information, such as thermal (temperature) information, ambient sound information, touch-sensing information, fingerprint information, voice recognition information, etc., may be used to determine the privacy level of a device.

For example, if the user recently unlocked the device, e.g., using a fingerprint sensor, the device may determine that the device is being used by the user. In this case, the privacy level of the device may be determined to be high (e.g., very private). Likewise, if the user has recently used a voice-activated application on the device, and the device has analyzed the voice and identified the voice as the user's, then the device may determine that the user is using the device, and the privacy level of the device may be determined to be high.

At 511 the device may determine whether the selected device is the receiving device (i.e., whether the device itself, which received the message, is the device with the highest privacy level). At 512 if the device that received the message is the device with the highest privacy level, the device may perform a private notification of the receipt of the message. In some embodiments, at 513 the device may further provide) a reason that receipt of the message is by a private notification. For example, the device might indicate to the user that the private notification is based on the fact that the message included the word "medication."

At 514, if the device determines the selected device is not the receiving device (i.e., a second device has a higher privacy level), the device may send an instruction to the second device to perform a private notification, such as one of the private notifications described herein, e.g., a visual notification with reduced detail. In various embodiments, the device may also instruct the other device to provide (513) a reason for the privacy selection to the user. For example, in various embodiments, motion information and location information may be used to determine privacy level. For example, the user may own a smartphone and a smart watch. A private text message may be sent to the smartphone. Motion information of the smart watch may indicate that the watch is being worn, while motion information of the smartphone may indicate that the smartphone hasn't recently moved, e.g., during the last 5 minutes. Location information of the smart watch and the smart phone might indicate the watch and phone are in different rooms of the user's house. Given this information, the smartphone might determine that the user is wearing the smart watch in one room of the house, while the smart phone in another room of the house has not recently been in motion. In this case, the smartphone may determine to perform notification of receipt of the text message on the smart watch because the user is more likely to see the notification and there is less risk that someone else will see the notification. In this regard, the smartphone might further instruct the smart watch to provide the user with the reason the smart watch was selected to provide the notification, i.e., because the smartphone is not in the same room as the user.

Figure 6:
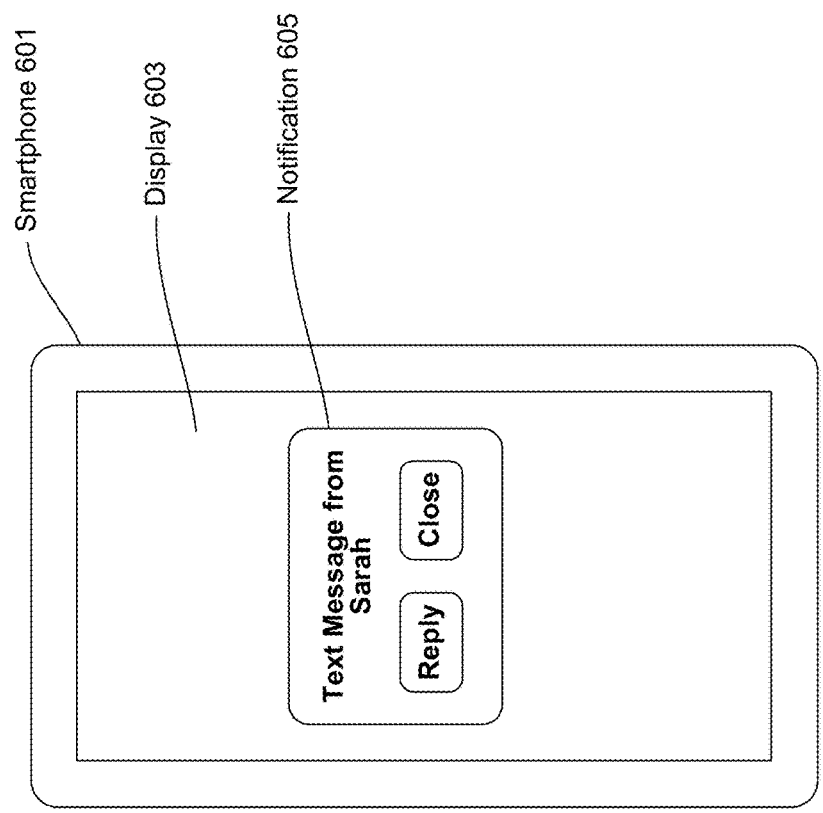
FIGS. 6 and 7 illustrate exemplary private notifications.
Figure 7:
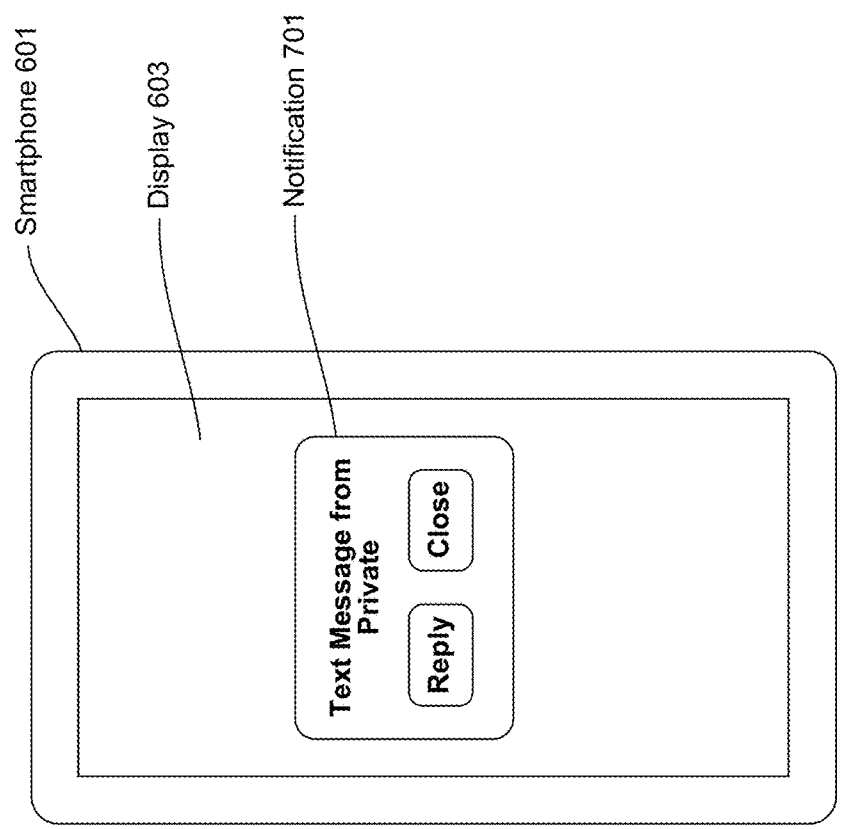

FIGS. 6 and 7 illustrate exemplary private notifications. For example, FIG. 6 shows a smartphone 601 with a display 603 displaying a notification 605 of a receipt of a text message, such the text message "Don't forget to take your antidepressant medication" from Sarah. In this case, the notification 605 identifies the sender, Sarah, but does not include the text of the text message. In the example shown in FIG. 7, a notification 701 of the same text message does not show the text message and does not show the sender. Instead, notification 701 indicates the sender is "Private." In various embodiments, the device, e.g., smartphone 601, may perform a private notification in other ways, such as by providing an audible notification (e.g., a beep) without providing a visual indication, for example.

Figure 8:
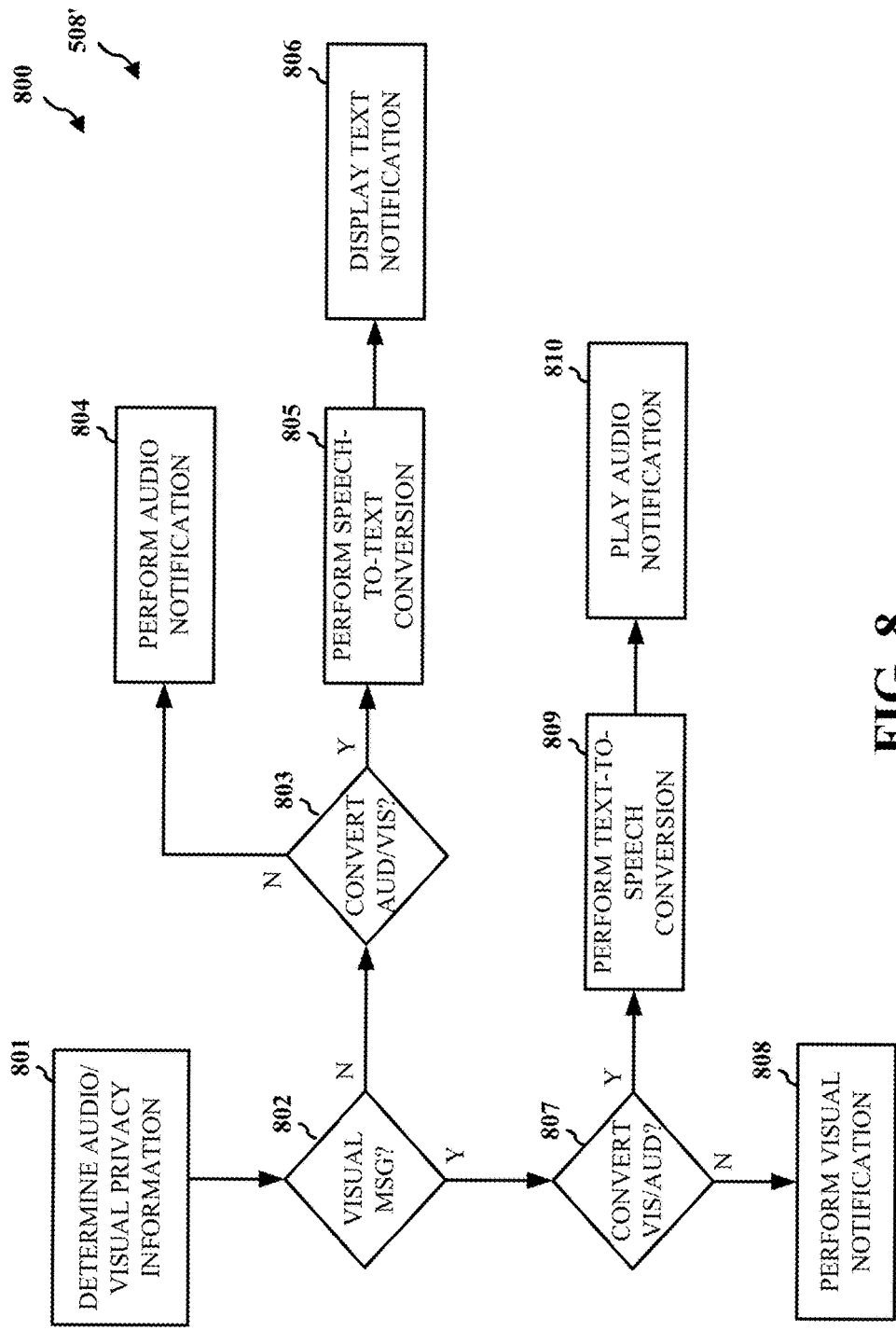
FIG. 8 is a flowchart of an exemplary method of determining whether to switch from an audio notification to a visual notification, or vice versa.

FIG. 8 is a flowchart of an exemplary method 800 of determining whether to switch from an audio notification to a visual notification, or vice versa. In various embodiments, method 800 may be performed as part of selecting a private notification, such as in block 508 of FIG. 5. Accordingly, method 800 is also labeled 508'.

At 801 a device receiving a message may determine audio/visual privacy information included in the message. For example, the device may determine information of whether notification of the message may be performed privately via a visual notification or an audio notification. If headphones are plugged into the device, for example, an audio notification may be a private way of notification. At 802, the device may determine whether the message is a visual message (such as a text message). If the message is not a visual message, e.g., the message is an audio message, at 803 the device may determine whether to convert the audio message into a visual message based on the audio/visual privacy information. If the device determines not to convert the message, the device at 804 may perform an audio notification of the audio message, such as playing a voicemail on the device speaker. On the other hand, the device may determine to convert the audio message into a visual notification, for example, by using speech recognition software to determine the text of a voicemail and displaying the text on a display screen of the device.

Figure 9:
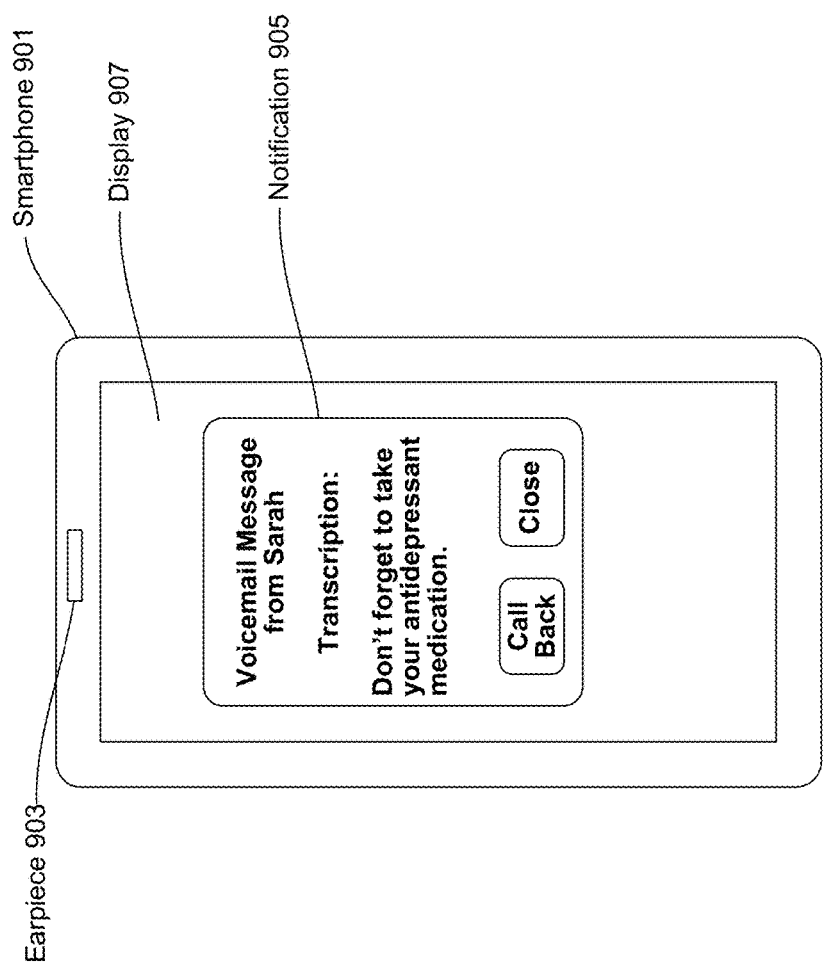
FIG. 9 is a flowchart of a method of wireless communication.

For example, referring to FIG. 9, a smartphone 901 may receive a voicemail message, for which the default notification includes playing the voicemail message over the earpiece speaker. However, the audio/visual privacy information determined by smartphone 901 may include an ambient noise level that indicates the smartphone is in a quiet environment. Accordingly, smartphone 901 may determine that the default playing of the voicemail message over the earpiece 903 may allow the voicemail message to be overheard. Therefore, smartphone 901 may determine to display a visual notification 905 on a display 907 instead.

Referring again to FIG. 8, if at 803, the device determines to convert the audio message into a visual message, then at 805 the device may perform a text-to-speech conversion of the audio information of the message and display (806) a text notification with some or all of the resulting text of the message.

If at 802 the device determines the message is a visual message (e.g., a text message), at 807 the device may determine whether to convert the visual message into an audio message, for example, because the device determines that headphones are plugged in and an audio notification would be very private. If the device determines not to convert the visual message into an audio message, at 808 the device may perform a visual notification. On the other hand, if the device determines to convert the visual message into audio, at 809 the device may perform a text-to-speech conversion and at 810 may play an audio notification of the converted speech.

Figure 10:
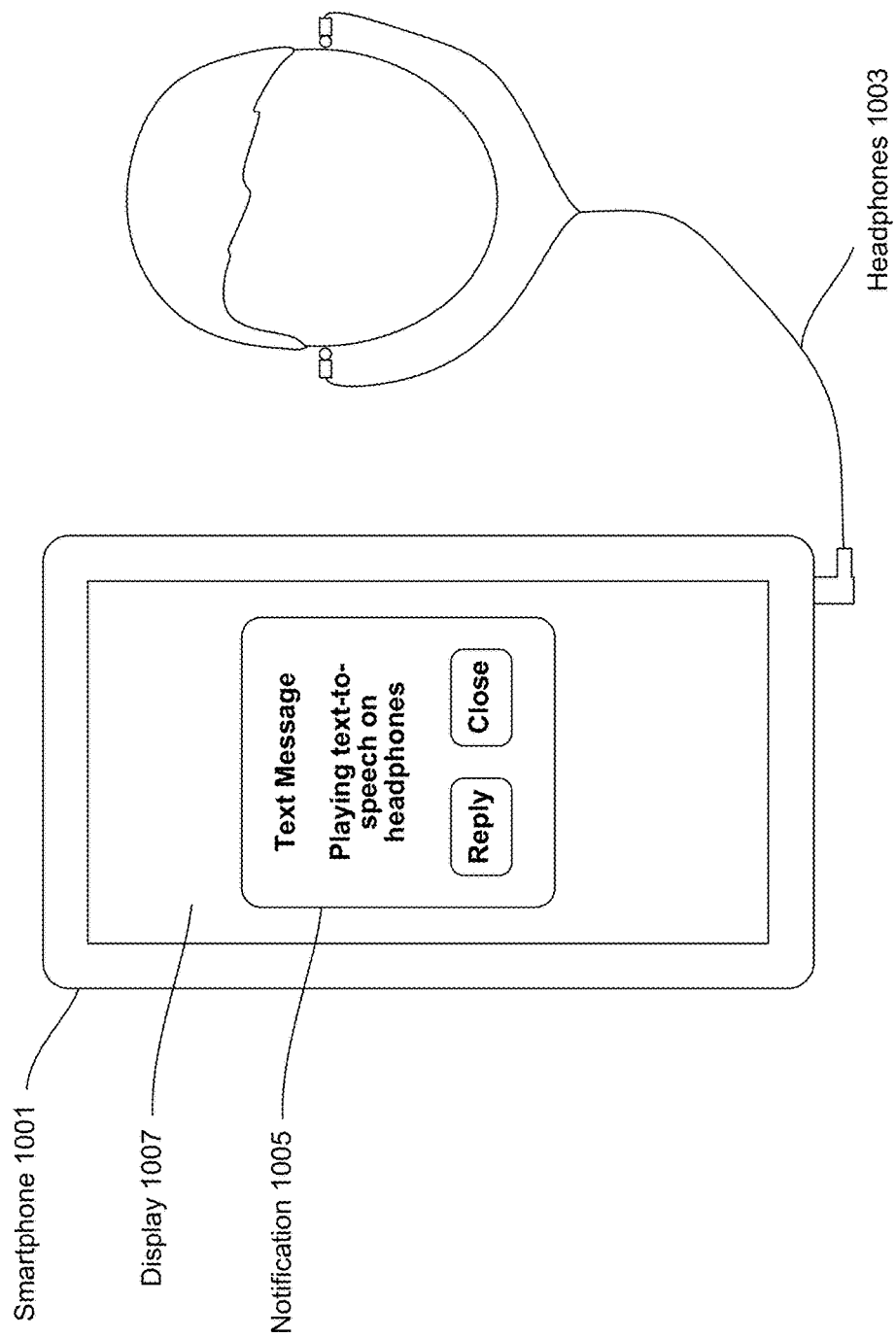
FIG. 10 is a flowchart of another method of wireless communication.

For example, referring to FIG. 10, a device 1001, e.g., a smartphone, may receive a visual message, e.g., a private text message. Smartphone 1001 may detect that headphones 1003 are plugged into the smartphone. Therefore, smartphone 1001 may determine that an audio notification of the private text message may be more private than a visual notification of the private text message. Smartphone 1001 may display a private, visual notification 1005 on a display 1007 that allows the user to play the audio notification via headphones 1003. In various embodiments, performing an audio notification of a visual message can include converting the visual message into audio information.

Thus, in various embodiments a device may modify the type of the message (audio/text) so that privacy is maintained in context of the device.

Figure 11:
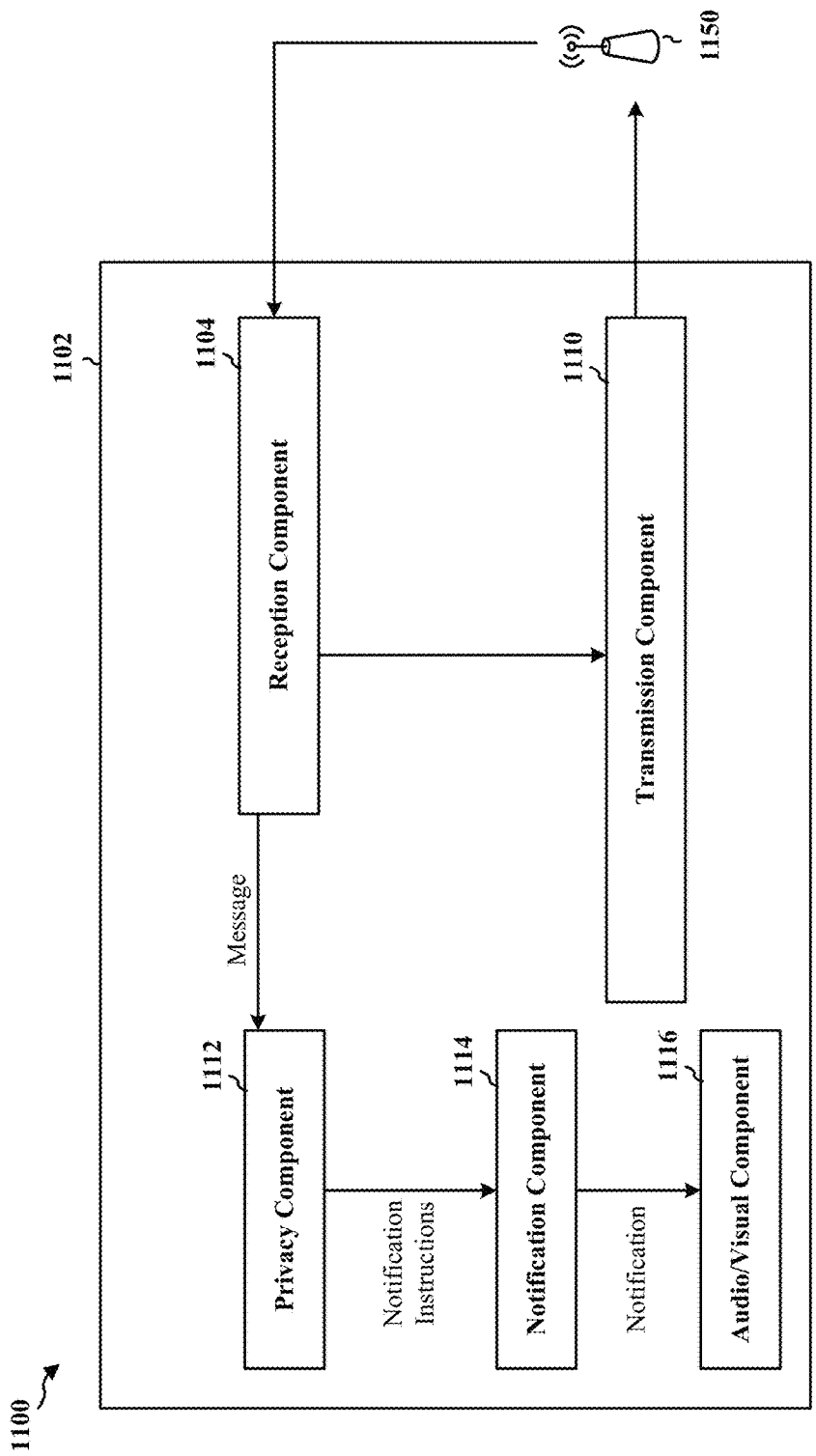
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE. The apparatus includes a reception component 1104 that receives a message, a transmission component 1110 that transmits communications to other devices, such as instructions to perform notifications, a privacy component 1112 that determines privacy information of the message, the apparatus, and other apparatuses, a notification component 1114 that performs a notification of the message based on a privacy determination of privacy component 1112, and an audio/visual component 1116 that plays and/or displays the notification. Reception component 1104 can receive the message and send the message to privacy component 1112. Privacy component 1112 can determine whether notification of the message should be performed by a default notification or a private notification, and can send notification instructions to notification component 1114. Notification component 1114 can perform a notification of the message by sending the notification to audio/visual component 1116. The apparatus may include additional components that perform each of the blocks of the algorithm in the aforementioned flowcharts of FIGS. 5 and 8. As such, each block in the aforementioned flowcharts of FIGS. 5 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
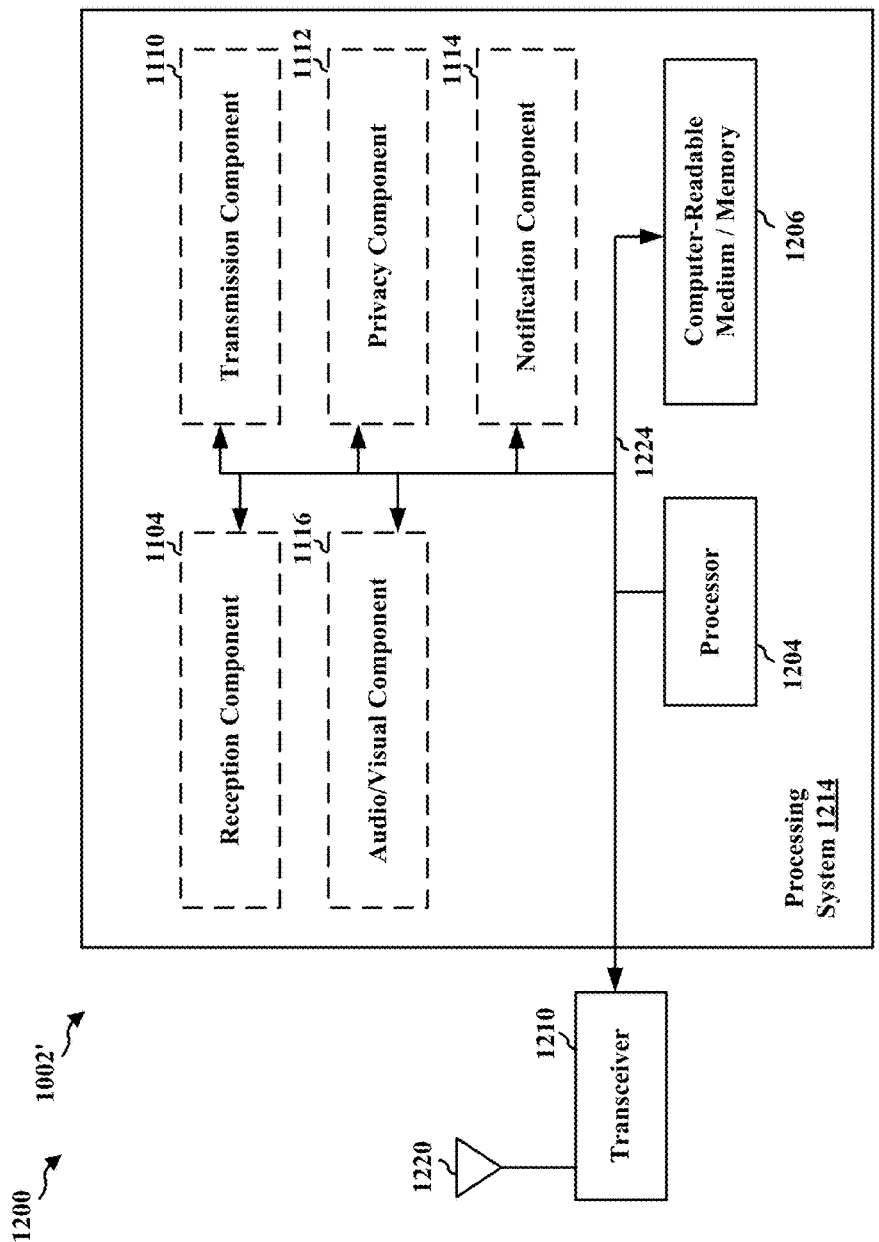
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1112, 1114, 1116, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206.

The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1112, 1114, 1116. The components may be software components running in the processor 1204, resident/stored in the computer readable medium/memory 1206, one or more hardware components coupled to the processor 1204, or some combination thereof. The processing system 1214 may be a component of the UE 250 and may include the memory 260 and/or at least one of the TX processor 268, the RX processor 256, and the controller/processor 259.

In one configuration, the apparatus 1102/1102' for wireless communication includes means for receiving the message, means for determining a privacy level of the message, means for selecting a mode of notification of the message based on the determined privacy level of the message, and means for performing a notification action based on the selected mode of notification. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 268, the RX Processor 256, and the controller/processor 259. As such, in one configuration, the aforementioned means may be the TX Processor 268, the RX Processor 256, and the controller/processor 259 configured to perform the functions recited by the aforementioned means.

In various other embodiments, a device may include an enhanced voice mail system that immediately notifies the user about the urgent calls without having to wait until the entire voicemail message is recorded. For example, the device may detect whether the call is urgent, for example, based on the tone of a caller's voice, the location of the caller (e.g., hospital), the call history of the caller and the identity of the caller, whether the caller has called multiple times, etc. If the call is determined to be urgent, the device may provide a notification while the voicemail message is still being recorded, and may allow the user to listen to the voicemail message in real time as the message is being recorded. The device may allow the user to connect with the caller while the voicemail is being recorded as well.

The above approach may ensure the user is not disturbed/distracted with multiple incoming calls while being able to receive and respond to urgent calls.

In various embodiments, a live transcript in text form may be provided from the voice mail or a limited portion of the voice mail may be provided to allow the message recipient to determine whether or not to answer the call.

In various embodiments, recorded voicemails can be arranged in the order of their priority, which can be determined, for example, by analyzing the text of the voice mail after speech-to-text conversion.

In various embodiments, incoming text messages may be parsed to detect if the text message is conveying any important or urgent information. For example, importance and urgency of the text message may be determined by parsing the text message for certain words. Based on the importance and urgency of the text message, one or more of the following actions may be taken: the sound profile of the device may be used for the important messages/ping and the silent profile may be used for irrelevant and un-important ones; an intelligent ring profile may be used for the incoming texts where a higher volume notifications is used for important messages and lower volume notification for the un-important ones or a different tone can be used for important vs non-important texts.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of notification of a message received by a device, comprising:
    receiving the message;
    determining a privacy level of the message;
    selecting a mode of notification of the message based on the determined privacy level of the message, wherein selecting the mode of notification of the message includes switching from a default mode of notification to a different mode of notification; and
    performing a notification action based on the selected mode of notification.

2. The method of claim 1, wherein switching from the default mode of notification to the different mode of notification includes at least switching from a visual notification to an audio notification or switching from the audio notification to the visual notification.

3. The method of claim 2, further comprising:
determining whether headphones are plugged into the device, wherein switching from the visual notification to the audio notification includes switching from displaying a text notification on a display screen of the electronic device to playing the audio notification through the headphones.

4. The method of claim 2, wherein the message is an audio message, the method further comprising:
converting at least a portion of the audio message into text information; and
displaying the text information on a display screen of the device.

5. The method of claim 1, further comprising:
providing an indication of a reason for switching from the default mode of notification to the different mode of notification to a user.

6. The method of claim 1, further comprising:
determining a first privacy level of the device;
determining a second privacy level of a second device; and
comparing the first privacy level of the device with the second privacy level of the second device,
wherein selecting the mode of notification of the message includes selecting the second device, and performing the notification action includes sending an instruction to the second device, the instruction instructing the second device to perform the notification of the message.

7. The method of claim 6, further comprising:
determining an orientation of the device, wherein determining the privacy level of the device is based on the determined orientation of the device.

8. The method of claim 7, wherein determining the orientation of the device includes determining at least one of a face-down orientation, a face-up orientation, an in-pocket orientation, an active orientation that indicates the device is being used, or an inactive orientation that indicates the device is not being used.

9. The method of claim 6, further comprising:
determining fingerprint information of the device, wherein determining the privacy level of the device is based on the determined fingerprint information of the device.

10. The method of claim 6, further comprising:
determining voice recognition information of the device, wherein determining the privacy level of the device is based on the determined voice recognition information of the device.

11. The method of claim 6, further comprising:
determining location information of the device, wherein determining the privacy level of the device is based on the determined location information of the device.

12. The method of claim 6, further comprising:
determining thermal sensing information of the device, wherein determining the privacy level of the device is based on the determined thermal sensing information of the device.

13. The method of claim 6, further comprising:
determining optical information of the device, wherein determining the privacy level of the device is based on the determined optical information of the device.

14. The method of claim 1, further comprising:
determining first identification information of a sender of the message;
determining whether the first identification information matches second identification information in a contact list associated with a second device, wherein selecting the mode of notification of the message includes selecting the second device when the privacy level of the message matches a threshold, and performing the notification action includes sending an instruction to the second device, the instruction instructing the second device to perform the notification of the message.

15. An apparatus for notification of a message received by a device, comprising:
means for receiving the message;
means for determining a privacy level of the message;
means for selecting a mode of notification of the message based on the determined privacy level of the message, wherein means for selecting the mode of notification of the message switches from a default mode of notification to a different mode of notification; and
means for performing a notification action based on the selected mode of notification.

16. An apparatus for notification of a message received by a device, comprising:
a memory; and
at least one processor coupled to the memory and configured to:
receive the message;
determine a privacy level of the message;
select a mode of notification of the message based on the determined privacy level of the message, wherein selecting the mode of notification of the message includes switching from a default mode of notification to a different mode of notification, and
perform a notification action based on the selected mode of notification.

17. The apparatus of claim 16, wherein switching from the default mode of notification to the different mode of notification includes at least switching from a visual notification to an audio notification or switching from the audio notification to the visual notification.

18. The apparatus of claim 16, the at least one processor further configured to:
determine a first privacy level of the device;
determine a second privacy level of a second device; and
compare a first privacy level of the device with the second privacy level of the second device,
wherein selecting the mode of notification of the message includes selecting the second device, and performing the notification action includes sending an instruction to the second device, the instruction instructing the second to perform the notification of the message.

19. The apparatus of claim 18, the at least one processor further configured to:
determine an orientation of the device, wherein determining the privacy level of the device is based on the determined orientation of the device.

20. The apparatus of claim 18, the at least one processor further configured to:
determine fingerprint information of the device, wherein determining the privacy level of the device is based on the determined fingerprint information of the device.

21. The apparatus of claim 18, the at least one processor further configured to:
determining voice recognition information of the device, wherein determining the privacy level of the device is based on the determined voice recognition information of the device.

22. The apparatus of claim 18, the at least one processor further configured to:
  determine location information of the device, wherein determining the privacy level of the device is based on the determined location information of the device.

23. The apparatus of claim 16, the at least one processor further configured to:
  determine first identification information of a sender of the message; and
  determine whether the first identification information matches second identification information in a contact list associated with a second electronic device, wherein selecting the mode of notification of the message includes selecting the second electronic device when the privacy level of the message matches a threshold, and performing the notification action includes sending an instruction to the second device, the instruction instructing the second device to perform the notification of the message.

24. A computer-readable medium storing computer executable code for notification of a message received by a device, comprising code to:
  receive the message;
  determine a privacy level of the message;
  select a mode of notification of the message based on the determined privacy level of the message, wherein selecting the mode of notification of the message includes switching from a default mode of notification to a different mode of notification; and
  perform a notification action based on the selected mode of notification.

25. The computer-readable medium of claim 24, wherein switching from the default mode of notification to the different mode of notification includes at least switching from a visual notification to an audio notification or switching from the audio notification to the visual notification.

26. The computer-readable medium of claim 24, further comprising code to:
  determine a first privacy level of the device;
  determine a second privacy level of a second device; and
  compare the first privacy level of the device with the second privacy level of the second device,
  wherein selecting the mode of notification of the message includes selecting the second device, and performing the notification action includes sending an instruction to the second device, the instruction instructing the second device to perform the notification of the message.

27. The computer-readable medium of claim 26, further comprising code to:
  determine an orientation of the device, wherein determining the privacy level of the device is based on the determined orientation of the device.

\* \* \* \* \*